United States Patent [19]

Nakamori

[11] 4,249,266
[45] Feb. 3, 1981

[54] FIBER OPTICS COMMUNICATION SYSTEM
[75] Inventor: Masami Nakamori, Sepulveda, Calif.
[73] Assignee: Perkins Research & Mfg. Co., Inc., Canoga Park, Calif.
[21] Appl. No.: 91,721
[22] Filed: Nov. 6, 1979
[51] Int. Cl.[3] .............................................. H04B 9/00
[52] U.S. Cl. ................................. 455/608; 350/96.16; 358/901; 455/612
[58] Field of Search ....................... 455/607, 608, 612; 350/96.16; 358/901

[56] References Cited
U.S. PATENT DOCUMENTS

| 4,161,650 | 7/1979 | Caouette | 455/612 |
| 4,166,946 | 9/1979 | Chown | 455/612 |
| 4,201,909 | 5/1980 | Dogliotti | 455/608 |

*Primary Examiner*—Howard W. Britton
*Attorney, Agent, or Firm*—Poms, Smith, Lande & Rose

[57] ABSTRACT

A fiber optics transceiver transmits and receives either synchronous or asynchronous data through a fiber optics data communication cable. The transceiver is connected to one end of the cable and communicates with an identical transceiver at the other end of the cable. The transceiver includes a transmitter for converting electrical digital data from a data source connected to the transmitter to optical flux for the cable. For asynchronous data, the flux comprises a train of positive-going pulses when the data is at a logical ONE, and a train of negaitve-going pulses when the data is at a logical ZERO. The train of pulses is interspaced at a fixed time interval and is restarted at each transition of the data between the logical ONE and logical ZERO state. For synchronous data, the flux comprises a train of positive-going pulses when the data is at a logical ONE, and a train of negative-going pulses when the data is at a logical ZERO. Each of the pulses in the train correspond to one transition of a clock waveform to which the data is synchronized. The transceiver also includes a receiver for converting optical flux from the cable to electrical digital data for data equipment connected to the receiver. For flux generated from asynchronous data, the receiver reconstructs the data. For flux generated from synchronous data, the receiver reconstructs both the data and the clock to which the data was synchronized. The transceiver also includes provisions for indicating the operationality of the data communications system formed by the two transceivers and the cable.

11 Claims, 10 Drawing Figures

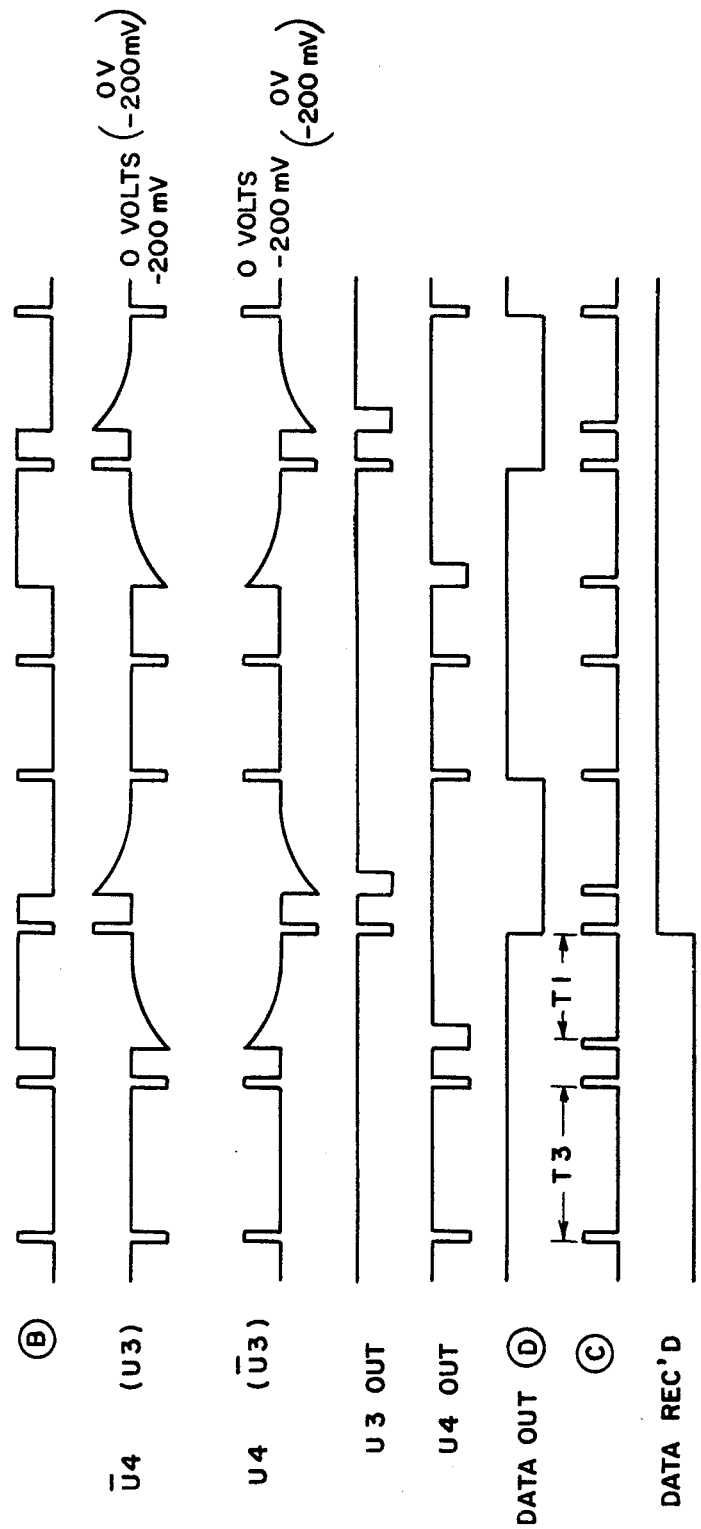

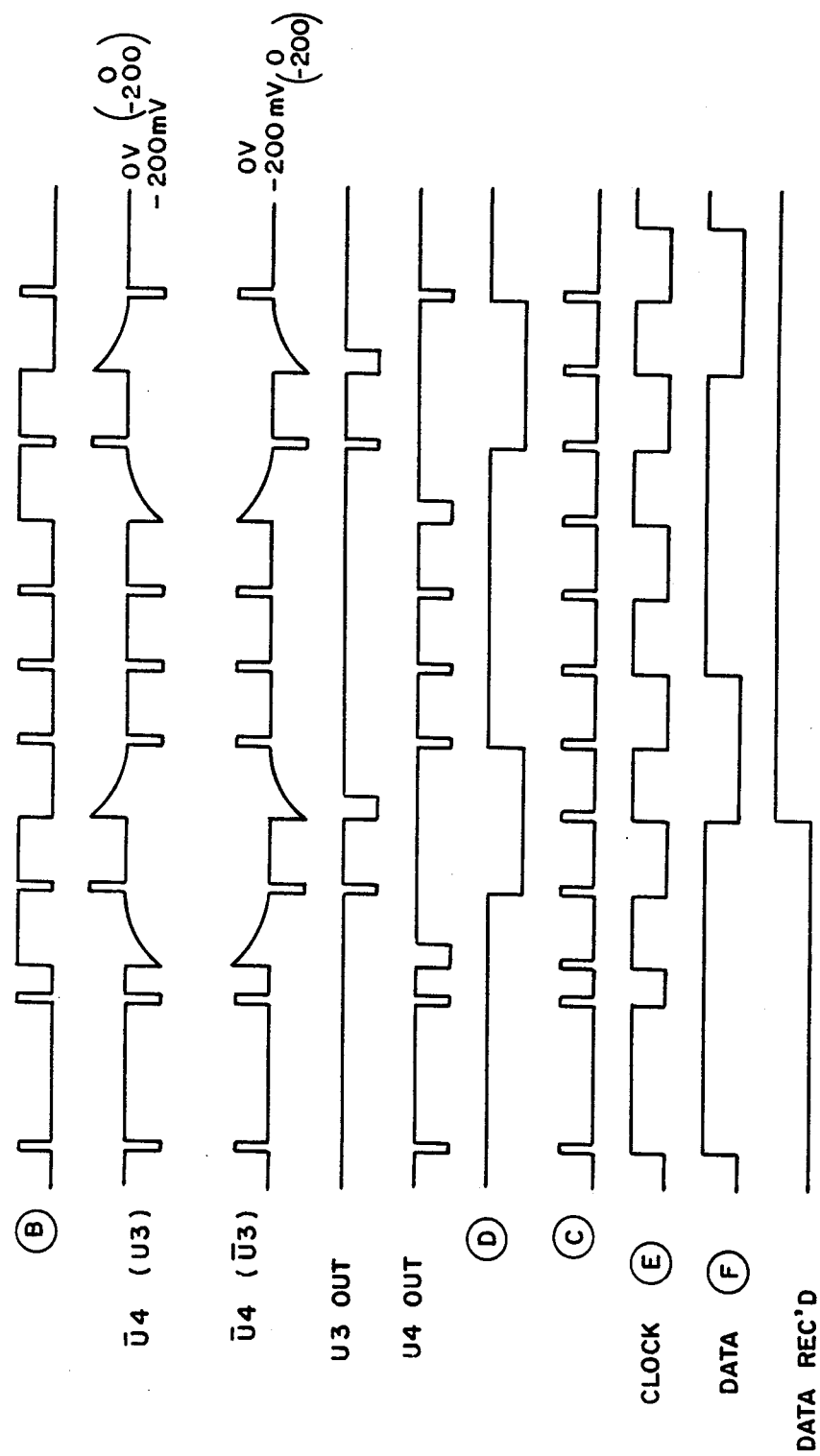

FIBER OPTICS COMMUNICATION SYSTEM

FIELD OF THE INVENTION

The present invention relates, in general, to fiber optics communication systems and, in particular, relates to data transceiver circuits which transmit signals to and receives signals from a fiber optics cable.

BACKGROUND OF THE INVENTION

The use of fiber optics technology in data communication is rapidly expanding. Optic fiber transmission links are used widely in connecting computers, instrumentation, and telephones. Fiber optic systems have tremendous advantages over copper-conductor systems. Besides being smaller and lighter than copper-conductor systems, fiber optic systems offer total electrical isolation, extremely high-speed wideband capability, and complete immunity to both noise and the broad spectrum of interference. Most importantly, fiber optics communication links are much less expensive than the copper-conductor systems.

With this rapid expansion of fiber optics technology, there is an increased demand for higher transmission rates and increased bandwidth. However, as all light pulses are unipolar, certain difficulties arise in the high-speed transmission of a long stream of ONES or ZEROS. In order to transmit such long streams, various coding schemes are utilized to reduce the distortion. Various coding and modulation schemes have been developed such as Manchester coding, frequency shift coding, phase shift coding, as well as various other coding schemes developed from these codes.

Additionally, the data to be transmitted through such systems occurs in several formats, such as asynchronous, synchronous, or bisynchronous. The data rates in these formats very widely, with the asynchronous data typically being at a much lower rate than the synchronous data. Accordingly, modern fiber optic transmisson systems should be able to transmit both asynchronous or synchronous data, and also to code such data in a manner preventing any distortion or loss of information.

Several fiber optic transmitting and receiving circuits are currently manufactured, but all of them are either limited in capability, or very expensive. The circuits currently available operate only in the asynchronous or the synchronous mode, and at limited data speeds. Furthermore, for the transmission of synchronous data, the clock and the data synchronized to it are often transmitted separately. Also, those circuits utilizing the various coding schemes currently available are often quite complex, and therefore very expensive.

Most importantly, few of the units currently available provide any indication of the integrity of the optical communications link. That is, the systems simply transmit data. It is very important to have an indication of the link continuity independently of the presence of the data in order to insure that a valid data link exists.

Accordingly, it is the principal object of the present invention to transmit and receive digital data through a fiber optics cable in an inexpensive and efficient manner.

It is another object of the present invention to transmit and receive both synchronous and asynchronous data through a fiber optics cable with a simple circuit.

It is a further object of the present invention to transmit and receive asynchronous and synchronous data over a wide range of speeds.

It is still another object of the present invention to transmit and receive synchronous data without the necessity of separately transmitting and receiving the clock to which the data is synchronized.

It is an additional object of the present invention to transmit data into a fiber optics communications cable in a format which is both easy to encode and decode.

It is a final object of the present invention to provide an indication of the operationality or viability of a fiber optics communication link when no data is being transmitted over the link.

SUMMARY OF THE INVENTION

The present invention, in a broad aspect, provides a fiber optic system data transceiver which both transmits and receives asynchronous or synchronous data through a fiber optics communication cable. The data transceiver is connected to one end of the cable and communicates with an identical transceiver at the other end of the cable. The transceiver includes a transmitter circuit for converting electrical digital data from a data source connected to the transmitter into an optical flux for the cable. For asynchronous data, the flux comprises a train of positive-going pulses when the data is at a logical ONE and a train of negative-going pulses when the data is at a logical ZERO. The train of pulses are interspaced at a fixed time interval and the train of pulses is restarted at each transition of the data between the logical ONE state and the logical ZERO state. For synchronous data, the flux comprises a train of positive-going pulses, when the data is at a logical ONE, and a train of negative-going pulses when the data is at a logical ZERO. Each of the pulses in the train respond to a transition of the clock to which the data is synchronized.

The transceiver also includes a receiver circuit which converts optical flux from the cable to electrical digital data for data equipment connected to the receiver circuit. For flux generated from asynchronous data, the receiver reconstructs the data and, for flux generated from synchronous data, the receiver reconstructs both the data and the clock from which the data was synchronized. The transceiver also includes a provision for indicating the operationality of the data communication system formed by the two transceivers and the cable.

In accordance with one feature of the invention, the transmitter includes a transmit pulse generator which generates, for asynchronous data, a train of pulses interspaced at a fixed time interval. The train of pulses is restarted at each transition of the data. For synchronous data, the transmit pulse generator produces a train of pulses, each corresponding to a transition of the clock waveform to which the data is synchronized. The transmitter also includes a circuit which combines the pulses generated by the transmit pulse generator and the synchronous or asynchronous data into a current waveform having a train of positive-going pulses corresponding to the pulses from the transmit pulse generator when the asynchronous or synchronous data is at a logical ONE, and having a train of negative-going pulses responding to the pulses from the transmit pulse generator when the data is at a logical ZERO. The current waveform is connected to a light-emitting diode which transforms it into the required optical flux for the cable.

In accordance with another feature of the invention, the transmitter includes a loop clock which generates a low-speed train of pulses for the diode when no synchronous or asynchronous data is entering the transmitter. In this manner, the transmitter either transmits the data pulses, or the low-speed pulse train. Thus, a continuing indication of the operationality of the dark link is provided.

In accordance with another feature of the invention, the receiver includes a PIN diode which transforms optical flux from the fiber optics cable into a current waveform. The current waveform is converted by an amplifier, which includes a preamplifier driving a video amplifier, to a pair of differential voltage waveforms. The differential waveforms drive opposite inputs of a pair of differential receivers configured to form a differential comparator array. The waveform at each true input of each receiver is level-shifted by a certain amount. Each receiver detects positive crossovers in the differential voltages at its input and generates a set of negative-going pulses based thereupon. The crossovers in the voltages at each receiver input define the boundaries of the logical ZERO levels in the voltage waveforms.

The two sets of pulses generated by the receivers are connected to a latch, which is reset by pulses from the first set of pulses and set by pulses from the second set of pulses. Depending on whether asynchronous or synchronous data is being transmitted by this system, the latch either produces the regenerated asynchronous data or unsynchronized synchronous data. The two pulse trains generated by the receivers are also combined into a single pulse train. The frequency of the pulse train indicates the presence or absence of data. This combined pulse train is divided in the receiver by a factor of two to regenerate the synchronous data clock if synchronous data is passing over the link and into the receiver. This regenerated clock regenerates the synchronous data by clocking the unsynchronized synchronous data at the output of the latch into a flip-flop, which then produces the synchronized data at its output.

The receiver also includes a frequency detector, which examines the frequency of the pulse train produced by combining the logical pulses from the comparators to determine whether the information entering the receiver is either data or the low-speed loop clock. In this manner, an indication is given as to whether the output of the receiver is valid data. Also, the frequency detector provides an indication whether the data link is valid by indicating the absence of either the loop clock or data.

In accordance with still another feature of the invention, the data transceiver can include the appropriate interface to convert the data to and from the EIA RS232 format.

Other objects, features, and advantages of the present invention will become apparent from a consideration of the following detailed description and from the accompanying drawings.

BRIEF DESCRIPTION OF THE DRAWINGS

FIG. 9 is a diagram showing waveforms at various locations of the receiver shown in FIG. 8, when the receiver is receiving asynchronous data; and FIG. 10 is a diagram showing waveforms at various locations in the receiver of FIG. 8, when the receiver is receiving synchronous data.

DETAILED DESCRIPTION

Figure 1:
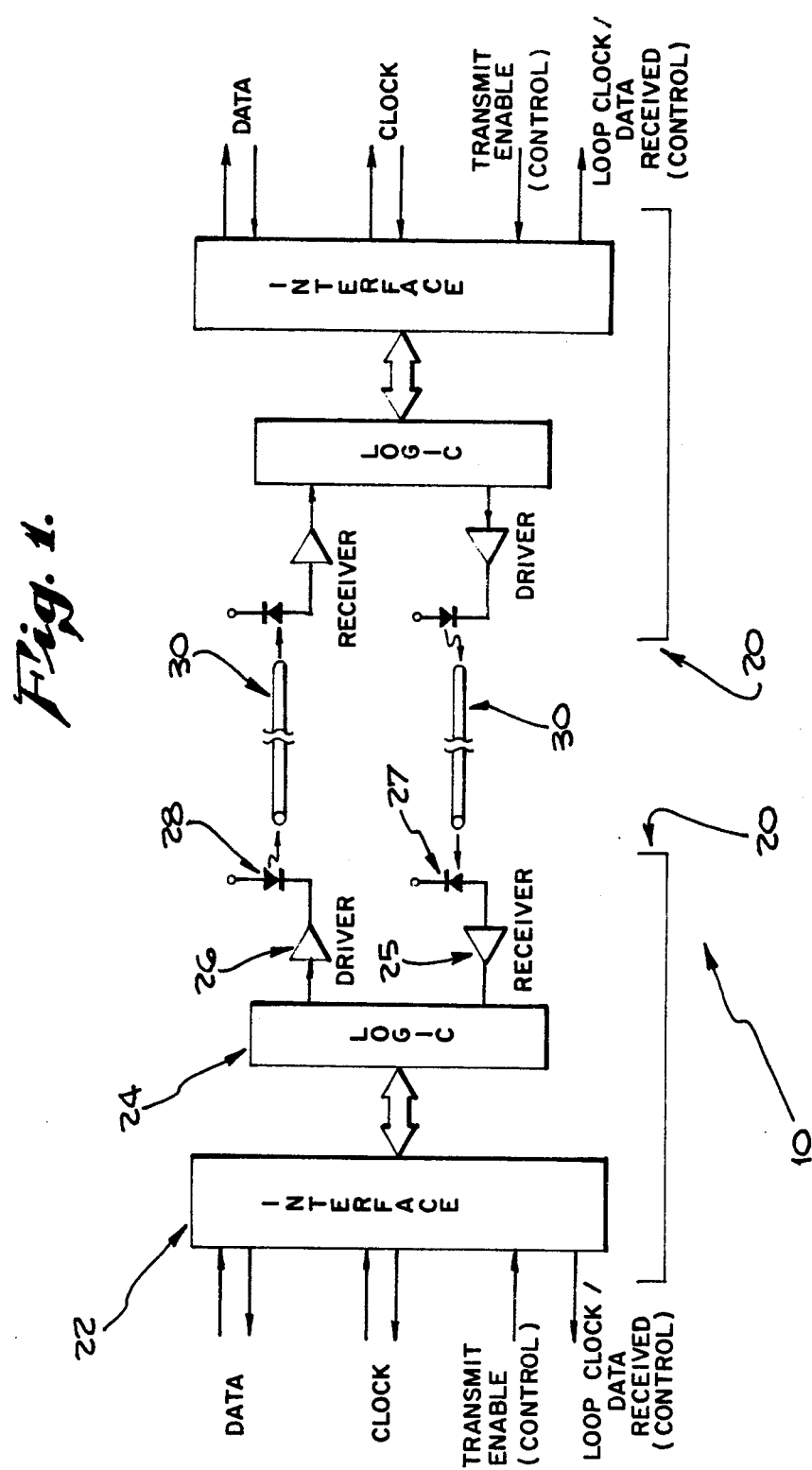
FIG. 1 shows a diagram of a fiber optics communication system utilizing data transceivers according to the present invention.

Referring more particularly to the drawings, FIG. 1 shows a block diagram of a fiber optics data communication system 10, comprising two data transceivers 20 driving two fiber optics cables 30. Each of the data transceivers 20 is identical, and consequently, only one of the transceivers 20 will be described below. The two transceivers 20 are utilized to provide the communication system 10 with full duplex operation, i.e., transmission in both directions.

Each data transceiver 20 accepts either synchronous data, with its accompanying clock, or asynchronous data. Additionally, each transceiver 20 has a pair of control lines. These lines include a "Transmit Enable" input, which begins the initiation of data transmission through the transceiver and a "Loop Clock/Data Received" output, which provides an indication of both the validity of data coming from the transceiver and an indication of the operationality of the data link.

Each transceiver, as shown in FIG. 1, can be diagrammatically shown as having an interface portion 22, communicating with a logic portion 24. The logic portion 24 drives data to a driving circuit 26 connected to a Light Emitting Diode (LED) 28, which sends information into the fiber optics cable 30 for transmission to a similar transceiving unit at the other end of the cable. This other transceiving unit 20 also sends information to the first transceiving unit over a different cable. The information enters the transceiver via a PIN photodiode 27 and is routed into the logic 24 via a receiver 25. In this manner, each transceiver 20 is fully capable of receiving and transmitting data.

As will be explained, each transceiver is capable of transmitting data up to 56 kbps asynchronously or synchronously. Each transceiver provides all of the electrical to optical conversions that are required to transmit EIA standard information through the fiber optics cable, and also provides the necessary optical to electrical conversions at the receiving end. Furthermore, the transceiver 20 provides a complete indication of the operationality of the communication system.

When the system is operated in the asynchronous mode, it has non-return-to-zero (NRZ) capability and places no restriction on the data format as long as the negative and positive durations of the pulses in the data are not less than a minimum specified value. When the system is operated in the synchronous mode, the data and the clock to which the data is synchronized are modulated and transmitted simultaneously. This particular mode of operation is achieved by use of a two-level coding scheme.

Figure 2:
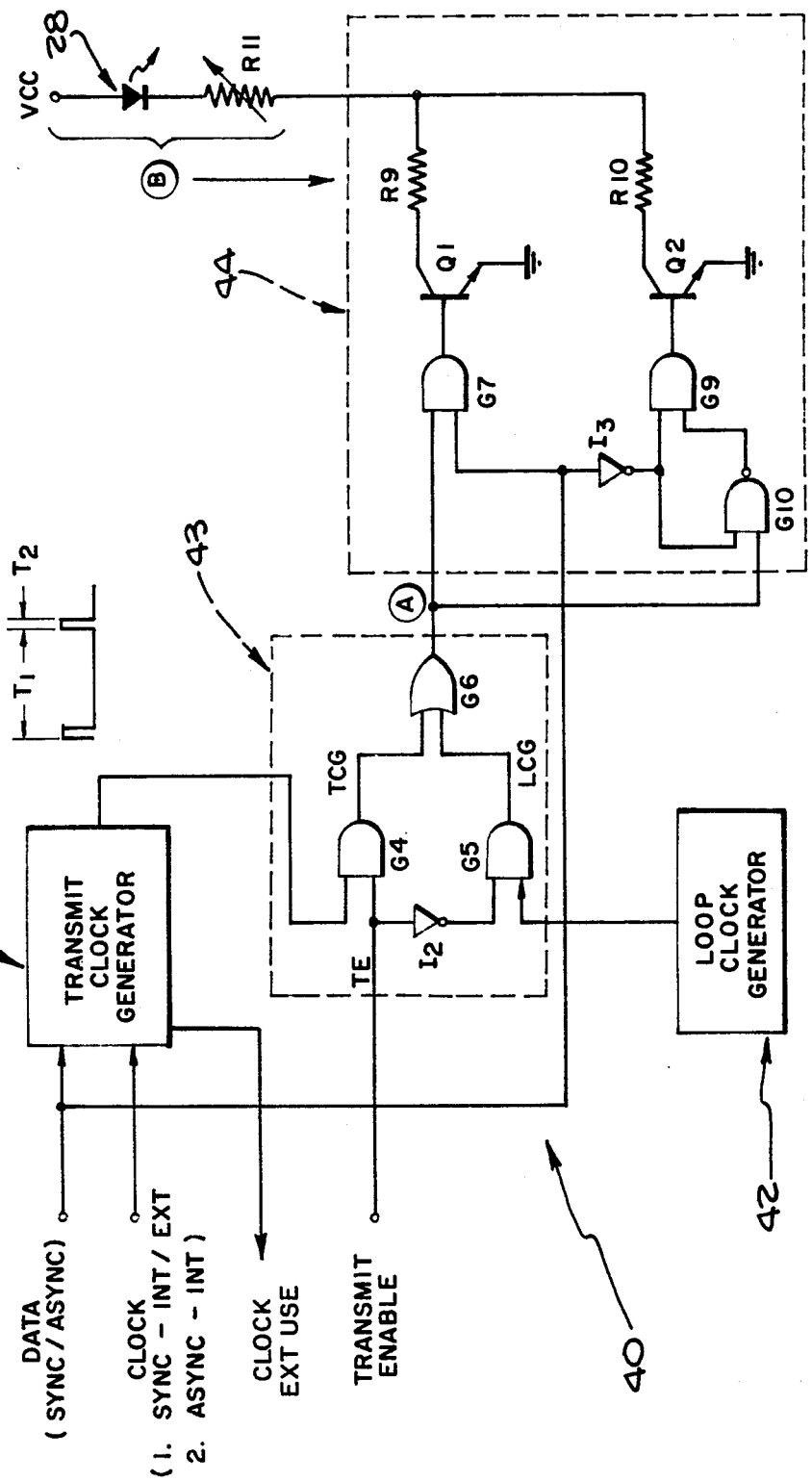
FIG. 2 shows a schematic diagram of the transmitter portion of the fiber optics data transceiver according to the present invention.

FIG. 2 shows a block diagram of the transmit portion of the data transceiver shown diagrammatically in FIG. 1. The transmitter portion, generally denoted 40, has several main sections, a Transmit Clock Generator 41, a Loop Clock Generator 42, a first gating array 43, a second gating array 44, as well as the LED 28. The inputs to the transmitter are the data to be transmitted over the fiber optics line, a clock, and the Transmit Enable signal. The data may be either synchronous or asynchronous. The clock input is used in several different ways. For synchronous data, the clock input may be the external clock to which the data is synchronized, or may an internal clock within the transmitter which is connected to an external circuit for synchronizing the data which is then supplied to the transmitter. While asynchronous data, by definition, is not synchronized to a clock, it will be shown that the present invention has the option of processing asynchronous data in two different methods. With the first method, the clock input is not utilized and the Transmit Clock Generator simply functions from the asynchronous data. With the second method, an internal clock of a frequency much higher than the asynchronous data is utilized to drive the Transmit Clock Generator 41.

Figure 3:
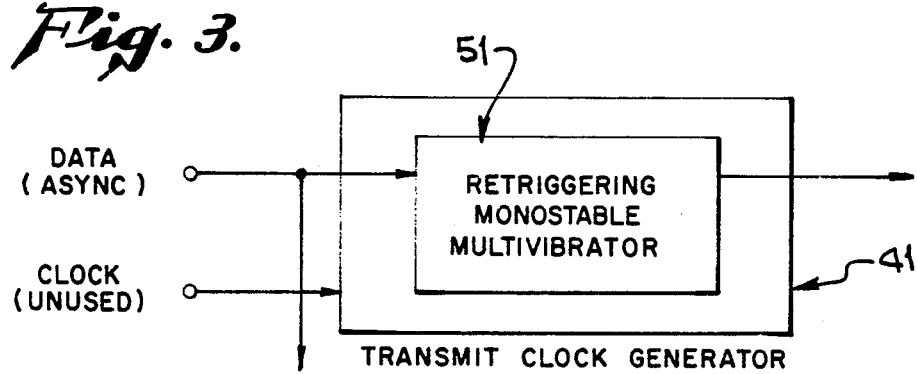
FIG. 3 shows a block diagram of a first embodiment of the transmit clock generator section of the transmitter portion of the fiber optics data transceiver according to the present invention.
Figure 4:
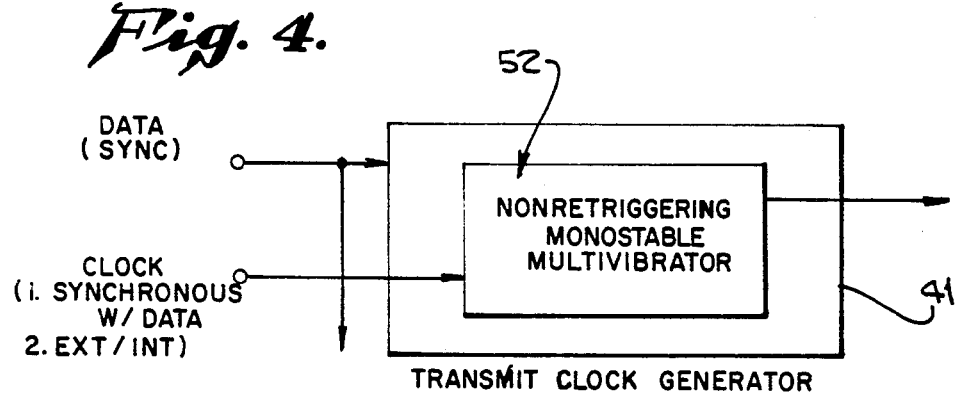
FIG. 4 shows a second embodiment of the transmit clock generator section of the transmitter portion of a fiber optics data transceiver according to the present invention.
Figure 5:
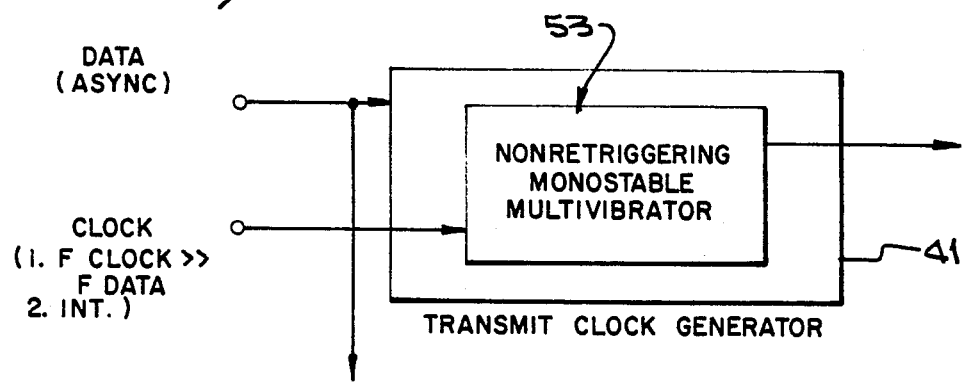
FIG. 5 shows a third embodiment of the transmit clock generator section of the transmitter portion of a fiber optics data transceiver according to the present invention.
Figure 6:
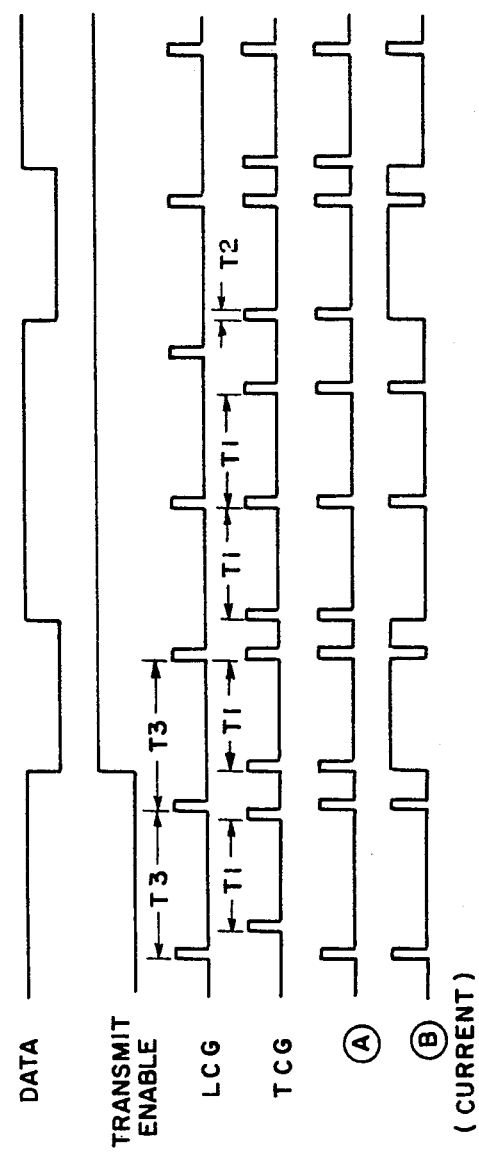
FIG. 6 is a diagram showing the waveforms at various locations in the transmitter shown in FIG. 2, when the transmitter is transmitting asynchronous data.

The basic possibilities for the configuration of the Transmit Clock Generator are shown in FIGS. 3-5. In FIG. 3, the clock input is unused and the asynchronous data is utilized to drive the Transmit Clock Generator 41. When this configuration is used, the Transmit Clock Generator 41 is internally configured as a retriggering monostable multivibrator. The output of the Transmit Clock Generator when operated in this mode is shown diagrammatically in FIG. 6. As seen in FIG. 6, the waveform TCG, which is the output of the transmit clock generator when gated by the Transit Enable signal provides a pulse train comprising of a series of narrow pulses interspaced at a regular interval T1. This pulse train is reinitiated at any transition of the asynchronous data. As will be explained, by combining the reinitiated pulse stream with the data itself, a uniquely-coded data stream results. It is this data stream which is then transmitted by the LED 28 into the fiber optics cable 30.

Figure 7:
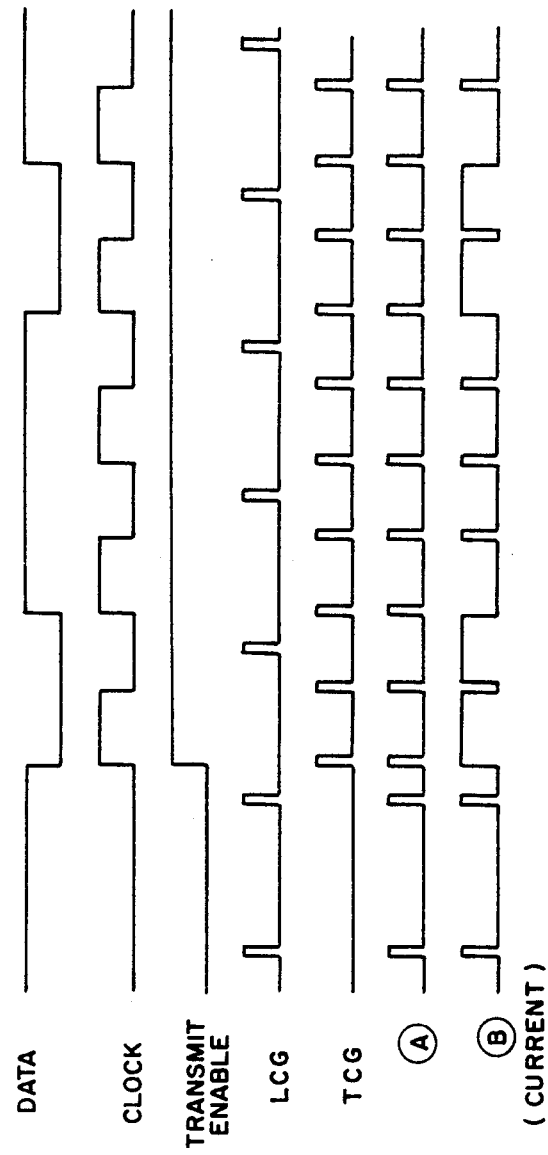
FIG. 7 is a diagram showing the waveforms at various locations in the transmitter shown in FIG. 2, when the transmitter is transmitting synchronous data.

Referring to FIG. 4, when the transmitter 40 is to transmit synchronous data, the Transmit Clock Generator 41 is internally configured as a nonretriggering monostable multivibrator 52. In this configuration, the multivibrator operates directly from a clock to which the data is synchronized. As mentioned, this may be an external clock supplied to the unit, or may be an internal clock within the unit which is routed to the data source for generation of the synchronized data. Referring to FIG. 7, it is seen that waveform TCG, which is again the output of the Transmit Clock Generator gated by the Transmit Enable signal, is a pulse train of narrow pulses, each pulse of which corresponds to a transition of the clock. This pulse train is again combined with the data itself to produce a uniquely-coded waveform for transmission into the fiber optics cable.

FIG. 5 shows the third possibility for the configuring of the Transmit Clock Generator 41. This configuration is used with asynchronous data, and is identical to the configuration shown in FIG. 4 wherein the Transmit Clock Generator 41 utilizes a non-retriggering monostable multivibrator. In FIG. 5, the multivibrator 53 is triggered by an internal clock whose frequency is much higher than that of the asynchronous data. Thus, the asynchronous data remains unsynchronized to the clock, but is treated similar to the synchronous data insofar as the output of the Transmit Clock Generator comprises a train of pulses, each pulse in which corresponds to one transition of the clock. This train is then combined with the asynchronous data to produce the waveform which will be transmitted into the fiber optics cable. Additionally, the use of a non-retriggering monostable multivibrator for both the asynchronous and synchronous data provides the advantage of a reduction in the hardware required. However, for purposes of this discussion only the waveforms for the configurations of the Transmit Clock Generator shown in FIGS. 3 and 4 are provided. It is to be understood, however, that the operation of the configuration shown in FIG. 5 is very similar to that shown in FIG. 4.

Referring again to FIG. 2, it is seen that the Loop Clock Generator 42 is gated with the output of the Transmit Clock Generator 41 via the first gating array 43 in the following manner. When the Transmit Enable signal is at a logical ONE, which signifies the initiation of a data transfer through the transmitter, AND gate G4 gates the output of the Transmit Clock Generator into OR gate G6 for routing to the second gating arrangement 44. Conversely, when the Transmit Enable signal is at a logical ZERO, the first gating array 43 gates the Loop Clock Generator via AND gate G5 into OR gate G6 for routing to the second gating array 44. Thus, the first gating array 43 is simply an electronic switch controlled by the Transmit Enable signal to gate either the output of the Transmit Clock Generator 41 or the output of the Loop Clock Generator 42 into the second gating array 44.

Regarding the Loop Clock Generator 42, it a low-speed oscillator generating a series of narrow pulses. The use of the Loop Clock Generator insures that the transmitter 40 will have some output at all times. This feature assists in the monitoring of the integrity of the data path.

The second gating array 44 takes the data and combines it with the output of the first gating array 43 to produce an output which forms a train of negative-going pulses when the data is at a logical ZERO and a train of positive-going pulses when the data is at a logical ONE. This waveform is generated by means of AND gates G7 and G9, inverter I3, and NAND gate G10. These gates drive transistors Q1 and Q2, which produce current waveforms which are "wire-or'd" at the junction of resistors R9 and R10 to provide a current waveform for the light emitting diode 28. Resistor R11 is a potentiometer used to control the current flow through the diode 28.

The operation of the transmitter 40 when processing asynchronous data (and utilizing the configuration of the Transmit Clock Generator shown in FIG. 3) may be easily understood from an examination of FIG. 6. As shown in FIG. 6, as long as the Transmit Enable signal is at a logical ZERO, the loop clock signal (denoted as waveform LCG) appears at both the output of the first gating array (shown as an encirled A in FIGS. 2 and 6), and at the node formed by the connection of resistors R9 and R10, shown as an encircled B in FIGS. 2 and 6. It is to be noted that all of the waveforms in FIG. 6 are voltage waveforms, with the exception of that shown for branch B, which is a current waveform from the junction of resistors R9 and R10 through the diode 28. Thus, as long as the Transmit Enable signal is at a logical ZERO, a pulse train having pulses interspaced at interval T3 is transmitted into the cable. It is to be noted that the Transmit Clock Generator 41 during this time is constantly generating a pulse train having an interpulse interval of T1 which is less than T3, and having a pulse width of T2.

As soon as the Transmit Enable signal goes to a logical ONE state, the first gating array 43 switches the output of the Transmit Clock Generator 41 into the second gating array 44. Simultaneous with this, the pulse train at the output of the Transmit Clock Generator is aligned with the transition of the data. The second gating array 44 combines the data and the output of the transmit Clock Generator to produce the waveform at branch B shown in FIG. 6. Since the data was at a logical ZERO when the transmit was enabled, the resulting waveform at branch B is a logical ONE with a negative-going section corresponding to the pulse automatically generated by the Transmit Clock Generator. As soon as the data goes to the logical ONE state, the pulse train from the transmit clock generator 41 is again aligned with the data transition, only this time the current waveform at branch B comprises a series of positive-going pulses corresponding to the pulses from the Transmit Clock Generator. As soon as the data returns to the logical ZERO state, the wave form at branch B again goes to the logical ONE state and contains negative-going pulses corresponding to the output of the Transmit Clock Generator.

When the transmitter 40 is to process synchronous data, and the Transmit Clock Generator is configured as shown in FIG. 4, the waveforms shown in FIG. 7 result. The operation is very similar to that shown for the asynchronous data, with the output of the Loop Clock Generator appearing at branch B until the transmittor is enabled via the Transmit Enable Line. When this occurs, each transition of the clock causes a pulse to be generated by the transmit clock generator 41. These pulses are then combined with the data by the second gating array 44 to produce a current waveform at branch B which has a logical ZERO with positive-going pulses corresponding to the output of the Transmit Clock Generator when the data is at a logical ONE state. Similarly, when the data is at a logical ZERO state, the waveform at branch B is at a logical ONE state, with negative-going pulses corresponding to the output of the Transmit Clock Generator 41.

It is thus seen that the basic concept used within the circuit is to combine the data entering the circuit with a series of pulses corresponding to either transitions in the data or transitions in the clock to which the data is synchronized. In either case, what is produced as a current waveform at branch B is either a logical ZERO with positive-going pulses, or a logical ONE with negative-going pulses. This current at branch B is then transformed into an optical flux by the LED 28 for transmission into the fiber optic cable 30.

Figure 8:
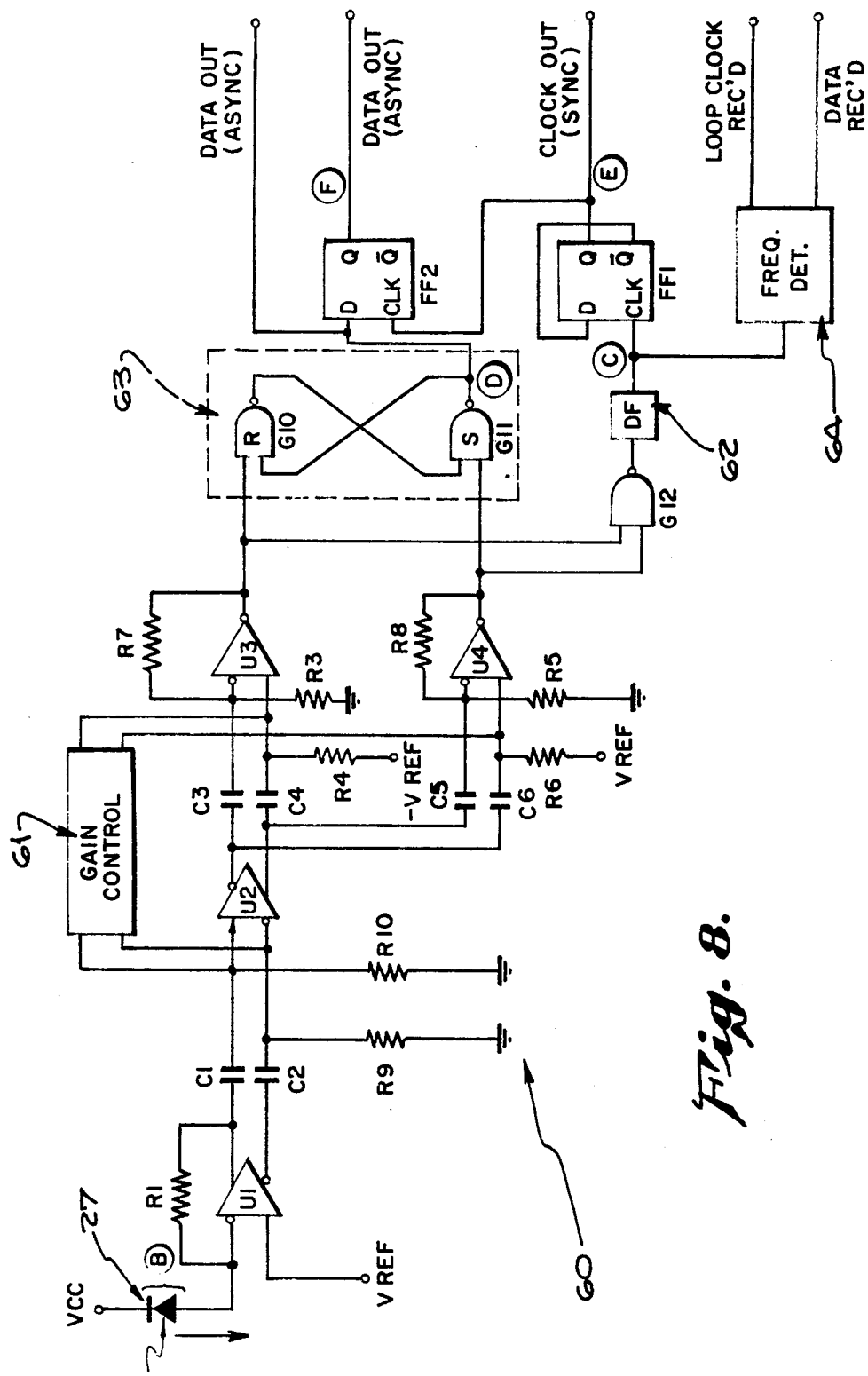
FIG. 8 is a schematic diagram of the receiver portion of the fiber optics data transceiver according to the present invention.

FIG. 8 shows the receiver section 60 of the fiber optics transceiver 20. The receiver 60 takes the optical flux from the fiber optics cable and regenerates either the asynchronous data, or the synchronous data and the clock to which it is synchronized. Also, the receiver provides an indication of whether the loop clock or data was received. The absence of either indication, of course, indicates that the data link has become inoperative. Also, unlike the transmitter 40, the configuration of the receiver is the same regardless of whether asynchronous or synchronous data is transmitted into it.

The receiver has several basic blocks. The first block is a two-stage amplifier formed by preamplifier U1 and video postamplifier U2, and the circuitry connected thereto, namely resistors R1, R3 through R6, R9, R10, capacitors C1 through C6, voltage reference VREF, and gain control 61. These components form a two-stage differential amplifier having complimentary or double-ended outputs.

The input to the two-stage amplifier is the current output produced by the photodiode 27, which may be a PIN diode, an avalanche photodiode, et cetera. Thus, at branch B in FIG. 8, is a current wave form identical to that shown at branch B in FIG. 2. The purpose of the two-stage amplifier is to convert this current waveform into two differential voltage waveforms. A two-stage amplifier used to produce the differential waveforms at a signal level which is convenient to work with. In particular, the double-ended output configuration shown in FIG. 8 produces a added 6 db gain. Capacitors C1 and C2 AC-couple amplifiers U1 and U2. The gain control for the amplifier array is provided by a gain control circuit 61, which normally comprises a simple diode feedback circuit.

To the true and complementary outputs of postamplifier U2 are connected resistor-capacitor networks formed by C3 through C6 and by R3 through R6, which cause the voltage output of the postamplifier U2 to exponentially decay if it is longer than a certain duration. Additionally, to these RC networks is connected a reference voltage. This reference voltage is typically a negative 200 mV, which shifts the DC levels of the waveforms output from U2 at the inputs of differential receivers U3 and U4. This shifting is necessary to allow the next portion of the circuit to detect voltage crossovers in the shifted waveforms, because such crossovers define the boundaries of the logical ZEROS in the data stream.

The next section of the receiver 60 is a differential comparator array formed by differential receivers U3 and U4, and resistors R7 and R8. These differential receivers are capacitively coupled through capacitors C3, C4, C5, and C6 to the differential output of postamplifier U2. As can be seen from FIGS. 9 and 10, which show the waveforms at various points in the receiver circuit 60 for the decoding of asynchronous and synchronous data, the waveform at the true input of U4 has been shifted 200 mV below the waveform at the complementary input. Similarly, the waveform at the true input of U3 has been shifted 200 mV below the input at its complementary input. As the true and complementary inputs of U3 and U4 are connected to opposite sides of the true and complementary outputs of U2, the particular configuration of U3 and U4 is such that they will generate negative-going pulses when there is any positive crossover of the differential voltages at the receiver inputs.

The outputs of receivers U3 and U4 are connected to a reset-set (R-S) latch 63 formed by NAND gates G10 and G11. The latch reconstructs any data input into the receiver, and therefore contains either the reconstructed asynchronous data, or an unsynchronized (relative to the original synchronizing clock) version of the transmitted synchronous data.

The pulsed outputs of receivers U3 and U4 are also combined to form a single positive-going pulse stream by NAND gate G12. This is necessary in order to recover the transmitted synchronous clock, or the loop clock. The output of gate G12 is connected to a digital filter 62. The digital filter 62, shown in FIG. 8, is a monostable multivibrator adapted to generate a single pulse from the rising edge of the pulse or'd by NAND gate G12. In this manner, any pulse jitter is effectively eliminated. The transmitted synchronous clock is recovered via flip-flop FF1, which is a D-latch. This flip-flop divides the pulse stream produced by gate G12 by a factor of two. As it will be remembered, the transmitter generated a pulse at each transition of the synchronous clock. Therefore, dividing the pulse stream from G12 by two will produce the original synchronous clock. The output of this flip-flop is connected to the clock input of a second flip-flop FF2, which is another D-latch. The data input of flip-flop FF2 is connected to the output of the R-S latch. This flip-flop FF2 is used to synchronize the output of the latch, and thereby regenerate the synchronous data. Thus, the receiver completely regenerates an asynchronous data stream or a synchronous data stream and the clock to which it is synchronized.

The final block in the receiver 60 is a frequency detector which examines the inter-pulse frequency of the pulse train generated by gate G12 to provide an indication of whether it is the loop clock which has been received or valid data. The frequency detector 64 basically utilizes a pair of monostable multivibrators adapted to generate pulses of different widths related to the data rate and to the loop clock rate. Accordingly, the proper indication of the presence of data is easily generated. An absence of any output from this block would indicate the non-operability of the data communication system.

FIGS. 9 and 10 show the waveforms at various points in the receiver circuit 60 for the decoding of asynchronous and synchronous data. The first waveform shown in FIG. 9 is that at branch B, which is identical to the asynchronous waveform produced at branch B in the transmitter circuit. The next two waveforms shown are those at the complementary and true inputs of differential receivers U3 annd U4. As can be seen, the true input of each of receivers has been negatively shifted away from the complementary input by 200 mV. However, the true and complementary inputs of U3 and U4 are connected to opposite sides of the differential U2 outputs. As soon as there is a positive crossing of these two waveforms at U3 or U4, a negative-going pulse is produced at the output of that receiver. As shown in FIG. 9, the areas between the positive crossovers at the comparator inputs correspond to the input data having a logical ZERO level.

The waveform at the output of the R-S (node D) latch is shown as waveform D in FIG. 9. As is seen, each pulse from comparator U3 resets the latch, and each pulse from comparator U4 sets the latch. In this manner, the latch contains the reconstructed asynchronous data.

Also, the waveform at the output of NAND gate G12 (node C) is shown as waveform C in FIG. 9. As is seen, the first two pulses correspond those generated by the Loop Clock having pulse interval of T3 which is greater than pulse interval T1, whereas all the other pulses correspond to the pulses generated by the Transmit Clock Generator. Accordingly, the output of the frequency detector 64, which is shown as the "Data Received" flag in FIG. 9, goes to a logical ONE state at the occurrence of the fourth pulse in waveform C which indicates ann increase in frequency to the T1 pulse interval in the waveform, and thus the presence of data at the output of the receiver.

FIG. 10 shows the operation of the receiver circuit 60 when synchronous data is being regenerated. The operation is identical to that previously described, with the output of postamplifier U2 being a level-shifted differential waveform. As before, differential receivers U3 and U4 produce negative-going pulses for the positive crossovers in the level-shifted waveforms. These pulses again set and reset the R-S latch and produce waveform D shown in FIG. 9. However, as mentioned, this waveform represents the unsynchronized version of the previously synchronized data. The output of NAND gate G12, however, is a pulse train having a pulses (after initiation of the data) corresponding to each of the transitions in the clock waveform to which the data was initially synchronized. Thus, the original clock is regenerated by flip-flop FF1, as shown in waveform E in FIG. 10. The regenerated external clock is used to clock the output of the R-S latch into flip-flop FF2, thereby synchronizing the data at the output of the latch and regenerating the original synchronous data, as shown in waveform F in FIG. 10. As before, the frequency detector 64 examines the interpulse spacing of the pulse train generated by NAND gate G12 and provides an indication of the initiation of the data.

As can be seen, the novel circuit of the present invention both transmits asynchronous data and synchronous data in a simple format and also maintain a constant indication of the integrity of the data communication link. Furthermore, the transmission of the synchronous data encodes the data with the clock, thereby obviating any necessity for their separate transmission. It has been found that a line speed of 56 kbps may be easily achieved in the synchronous or asynchronous mode with the circuit. Additionally, if the circuit is to transmit asynchronous data using the internal clock (as discussed in conjunction with FIG. 5), it has been found that asynchronous data may be easily transmitted at 19.2 kbps using an internal clock frequency of 56 kbps with a minimum of pulse jitter.

Additionally, both the transmit circuit and the receive circuits may contain the appropriate components to be compatible with data in the EIA RS-232 format. Such components have been shown diagrammatically in block 22 in FIG. 1.

In the foregoing description of the present invention, a preferred embodiment of the invention has been disclosed. It is to be understood that other design variations are within the scope of the present invention. Thus, by way of example and not of limitation, the LED diode in the transmitter could be replaced by a small laser transmitter; the PIN diode in the receiver could be replaced by an avalanche photodiode; different means could be utilized to generate the transmit clock pulses and to combine them with the data to produce the necessary waveforms; different means could be utilized to create differential, overlapping voltage waveforms from the optical flux and to produce pulses based upon the positive overlapping areas within the waveforms; and different means could be utilized to detect the change in speed from the loop clock to the data clock to determined the initiation of data through the communications system. Accordingly, the invention is not limited to the particular arrangement which has been illustrated and described in detail herein.

What is claimed is:

1. A fiber optics data transceiver for both transmitting and receiving either asynchronous or synchronous data through a fiber optics data communication cable, said transceiver being connected to one end of said cable and communicating with an identical transceiver at the other end of said cable and comprising:
    (a) transmitter means for converting digital data from a data source connected to said transmitter means to optical flux for said cable, said flux comprising:
        (i) for asynchronous data, a train of positive-going pulses when said data is at a logical ONE, and a train of negative-going pulses when said data is at a logical ZERO, said train of pulses being interspaced at a fixed time interval and being restarted at each transition of said data between said logical ONE and said logical ZERO; and
        (ii) for synchronous data, a train of positive-going pulses when said data is at a logical ONE, and a train of negative-going pulses when said data is at a logical ZERO, said pulses in said train each corresponding to a transition of a clock waveform to which said data is synchronized;
    (b) receiver means for converting said optical flux from said cable to digital data for a data sink connected to said receiver means, whereby,
        (i) for flux generated from said asynchronous data, said receiver means reconstructs said data; and
        (ii) for flux generated from said synchronous data, said receiver means reconstructs said data and said clock to which said data was synchronized; and
    (c) means for indicating the operationality of the data communications system formed by said two transceivers and said cable.

2. A fiber optics data transceiver as defined in claim 1, wherein said transmitter means comprises:
    (a) transmit pulse generator means for generating:
        (i) for said asynchronous data, a train of pulses interspaced at a fixed interval, said train being restarted at each of said transitions of said data; and
        (ii) for said synchronous data, a train of pulses wherein each of said pulses corresponds to a transition of said clock waveform to which said data is synchronized;
    (b) means for combining said pulses generated by said transmit pulse generator means and said asynchronous or synchronous data into a current waveform comprising a train of positive-going pulses corresponding to said pulses from said pulse generator means when said asynchronous or synchronous data is at a logical ONE and a train of negative-going pulses corresponding to said pulses from said pulse generator means when said asynchronous or synchronous data is at a logical ZERO; and
    (c) diode means for transforming said current waveform into said optical flux.

3. A fiber optics data transceiver as defined in claim 2, wherein said transmitter means further comprises:
    (a) means for enabling said transmitter means to transmit said asynchronous or synchronous data; and
    (b) loop clock means, connected to said enabling means, for generating a low-speed train of pulses for said diode means when none of said asynchronous or synchronous data is entering said transmitter means, whereby said transmitter means either transmits said data or said low-speed pulse train depending on the state of said enabling means, said low-speed pulse train thereby indicating said operationality of said communication system.

4. A fiber optics data transceiver as defined in claim 3, wherein:
    (a) said transmit pulse generator means comprises monostable multivibrator means for selectively generating a narrow pulse on each of said transitions of said asynchronous data and on each of said transitions of said clock synchronizing said synchronous data, said monostable multivibrator means being adapted for automatic regeneration of said narrow pulse after said fixed time interval when said asynchronous data is connected to said transmitter means;
    (b) said combining means comprises:
        (i) first logical gating means, connected to said transmit pulse generating means, said enabling means, and said loop clock means, for gating said pulses from said transmit pulse generating means when said enabling means is enabled, and for gating said pulses from said loop clock means when said enabling means is disabled;
        (ii) second logical gating means for combining said asynchronous or synchronous data and said gated pulses from said first gating means to generate a current defined by the logical OR of the logical AND of said data and said gated pulses and by the logical NAND of said data in the inverted state and of the logical AND of said inverted data and said gated pulses;
    (c) said loop clock means comprises a low-speed pulse oscillator; and
    (d) said diode means comprises a PIN diode.

5. A fiber optics data transceiver as defined in claim 4, wherein said transmitter means further comprises:
    interface means for converting said asynchronous or synchronous data from EIA RS-232 format to standard TTL logic levels.

6. A fiber optics data transceiver as defined in claim 1, wherein said receiver means comprises:
    (a) diode means for transforming said optical flux from said cable into a current waveform;
    (b) amplifier means for converting said current waveform into a pair of level-shifted differential voltage waveforms;
    (c) comparator means for detecting positive crossovers in said shifted differential voltage waveforms and for generating first and second sets of logic-level pulses based thereupon, said crossovers defining the boundaries of said logical ZEROs in said voltage waveforms;
    (d) latch means, reset by said first set of logic-level pulses and set by said second set of logic-level pulses, for regenerating said asynchronous data;
    (e) means for combining said first and second sets of logic-level pulses into a single pulse train, wherein the frequency of said train indicates the presence or absence of data;

(f) clock regenerating means, connected to said combining means, for regenerating said clock to which said synchronous data was synchronized; and (g) synchronous data regeneration means, connected to said latch means and said combining means, for regenerating said synchronous data.

7. A fiber optics data transceiver as defined in claim 6, wherein said receiver means further comprises:

frequency detection means, connected to said combining means, for determining whether said frequency of said pulse train therein is greater than a predetermined level indicating the presence of said synchronous or said asynchronous data.

8. A fiber optics data transceiver as defined in claim 7, wherein:

(a) said diode means comprises a PIN diode;

(b) said amplifier means comprises:

(i) two-stage preamplifier means, having a differential input and true and complimentary outputs, for converting said current waveform into a pair of differential voltage waveforms;

(ii) capacitor means, connected to said outputs, for blocking any DC components of said differential voltage waveform;

(iii) means for shifting the DC level of said waveforms relative to a reference voltage; and (iv) voltage-decay generating means, connected to said capacitor means, for causing the exponential decay of said shifted waveforms is if said waveforms are longer in duration than a predetermined interval; and (c) said comparator means comprises:

(i) a first differential receiver connected through said capacitor means to said complementary and true outputs of said preamplifier means, for generating a first negative-going logic-level pulse when said level-shifted differential waveforms positively cross over in value, said positive crossover indicating the beginning of a logical ZERO in said shifted voltage waveform; and (ii) a second differential receiver connected through said capacitor means to said true and complementary outputs of said preamplifier means, for generating a second negative-going logic-level pulse when said differential voltages at said input positively cross over, said positive crossover indicating the end of a logical ZERO in said voltage waveforms;

(d) said latch means comprises a set-reset latch, said latch being reset by said first negatively-going logic-level pulse and being set by said second negative-going logic-level pulse, said reset output of said latch providing said regenerated asynchronous data and said regenerated synchronous data in an unsynchronous form, wherein each of said logical ZEROs in said data are determined by a consecutive resetting and setting of said latch means;

(e) said means for combining comprises logic gating means for generating a pulse train defined by the logical NAND of said first and second negative-going pulses from said differential receivers;

(f) said clock regenerating means comprises first flip-flop means, adapted to divide said pulse train from said combining means by a factor of two, thereby reproducing the original clock waveform to which said synchronous data was synchronized;

(g) said synchronous data regenerating means comprises second flip-flop means, connected to said latch means and clocked by said first flip-flop means, for synchronizing said unsynchronized synchronous data at the output of said latch means with the output of said first flip-flop means, thereby resynchronizing said synchronous data with said clock; and (h) said frequency detection means comprises monostable multivibrator means for generating a continuous pulse during the receipt of said synchronous or asynchronous data.

9. A fiber optics data transceiver as defined in claim 8, wherein:

(a) said receiver means further comprises digital filter means, connected to said means for combining, for removing any jitter from said pulse train; and (b) said voltage-decay generating means and said means for shifting comprise a pair of resistor-capacitor networks connected to the outputs of said preamplifier means and connected to a reference voltage.

10. A fiber optics data transceiver as defined in claim 8, wherein said receiver means further comprises:

interface means for converting said regenerated asynchronous or synchronous data and said regenerated synchronous clock from a standard TTL logic level to an EIA RS-232 format.

11. A fiber optics data transceiver as defined in claim 1, wherein said means for indicating the operationality of said data communications system comprises:

(a) low-speed pulse generating means, within said transmitter means, for generating a slower train of pulses than that produced by said asynchronous or synchronous data;

(b) means, within said transmitter means, for converting pulses from said low-speed pulse generating means into said optical flux and for transmitting said flux into said cable when none of said asynchronous or synchronous data is entering said transmitter means;

(c) means, within said receiver means, for distinguishing between said low-speed pulses and said data pulses; and (d) means, within said receiver means, for indicating the receipt of said low-speed pulses, whereby said transmitter means either transmits said low-speed pulses or said data pulses through said cable and said receiver means continually receives either said low-speed pulses or said data pulses, whereupon the absence of either of said pulses indicates the nonoperationality of said system.

* * * * *